United States Patent
Loewen

(10) Patent No.: US 10,431,861 B2
(45) Date of Patent: Oct. 1, 2019

(54) COOLING STRUCTURE FOR AN ENERGY STORAGE DEVICE

(71) Applicant: FLEXTRONICS INTERNATIONAL KFT., Tab (HU)

(72) Inventor: Viktor Loewen, Cologne (DE)

(73) Assignee: FLEXTRONICS INTERNATIONAL KFT., Tab (HU)

(*) Notice: Subject to any disclaimer, the term of this patent is extended or adjusted under 35 U.S.C. 154(b) by 611 days.

(21) Appl. No.: 14/916,690

(22) PCT Filed: Sep. 8, 2014

(86) PCT No.: PCT/EP2014/069060
§ 371 (c)(1),
(2) Date: Mar. 4, 2016

(87) PCT Pub. No.: WO2015/036356
PCT Pub. Date: Mar. 19, 2015

(65) Prior Publication Data
US 2016/0203920 A1      Jul. 14, 2016

(30) Foreign Application Priority Data
Sep. 10, 2013   (EP) .................................... 13183795

(51) Int. Cl.
*H01M 10/6566* (2014.01)
*H01M 10/625* (2014.01)
(Continued)

(52) U.S. Cl.
CPC ......... *H01M 10/6566* (2015.04); *B60L 50/50* (2019.02); *B60L 50/64* (2019.02); *H01G 2/04* (2013.01); *H01G 2/08* (2013.01); *H01G 11/18* (2013.01); *H01G 11/78* (2013.01); *H01G 11/82* (2013.01); *H01M 2/1077* (2013.01); *H01M 10/613* (2015.04); *H01M 10/625* (2015.04);
(Continued)

(58) Field of Classification Search
None
See application file for complete search history.

(56) References Cited

U.S. PATENT DOCUMENTS

| | | | |
|---|---|---|---|
| 2002/0006544 A1* | 1/2002 | Asaka | H01G 9/26 429/99 |
| 2007/0046259 A1* | 3/2007 | Shimizu | H01M 2/105 320/116 |
| 2011/0020676 A1* | 1/2011 | Kurosawa | B60K 1/04 429/62 |

FOREIGN PATENT DOCUMENTS

| | | |
|---|---|---|
| CA | 2545285 | 5/2005 |
| CN | 202 434 668 U | 9/2012 |

(Continued)

OTHER PUBLICATIONS

Office Action for European Patent Application No. 13183795.7, dated Jul. 4, 2016, 6 pages.
(Continued)

*Primary Examiner* — Ula C Ruddock
*Assistant Examiner* — Tony S Chuo
(74) *Attorney, Agent, or Firm* — Sheridan Ross P.C.

(57) ABSTRACT

Proposed is an energy storage device, particularly for use in motor vehicles, comprising at least one base body as well as at least one housing section fixed thereto for accommodating at least one energy storage unit. The energy storage device is characterized by the base body comprising at least one integrated cooling duct for a gaseous medium.

19 Claims, 4 Drawing Sheets

Figure 1:
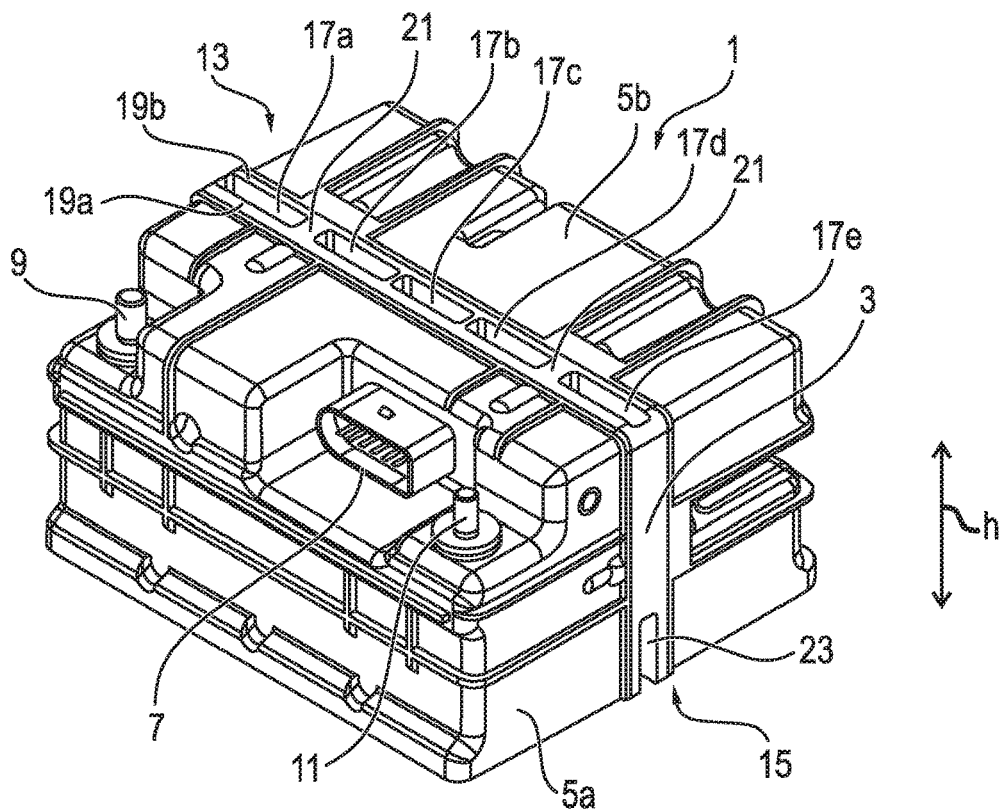

(51) Int. Cl.
  *H01G 11/78*  (2013.01)
  *H01G 11/18*  (2013.01)
  *H01M 2/10*  (2006.01)
  *H01M 10/6563*  (2014.01)
  *H01M 10/6556*  (2014.01)
  *H01M 10/6557*  (2014.01)
  *H01M 10/613*  (2014.01)
  *H01G 11/82*  (2013.01)
  *H01G 2/04*  (2006.01)
  *H01G 2/08*  (2006.01)
  *B60L 50/50*  (2019.01)
  *B60L 50/64*  (2019.01)

(52) U.S. Cl.
  CPC ... *H01M 10/6556* (2015.04); *H01M 10/6557* (2015.04); *H01M 10/6563* (2015.04); *H01M 2220/20* (2013.01); *Y02E 60/13* (2013.01); *Y02T 10/7005* (2013.01); *Y02T 10/705* (2013.01); *Y02T 10/7022* (2013.01)

(56) References Cited

FOREIGN PATENT DOCUMENTS

| CN | 202434668 U | * | 9/2012 | .......... H01M 10/613 |
| DE | 10 2006 040202 A1 | | 3/2007 | |
| DE | 10 2008 03488 A1 | | 6/2009 | |
| DE | 102008034886 A1 | * | 6/2009 | ............ H01M 10/50 |
| EP | 2 262 048 A1 | | 12/2010 | |
| EP | 2608309 | | 6/2013 | |
| JP | 2001 229901 A | | 8/2001 | |
| JP | 2011058980 | | 3/2011 | |

OTHER PUBLICATIONS

International Search Report and Written Opinion prepared by the European Patent Office dated Oct. 15, 2014, for International Application No. PCT/EP2014/069060.

* cited by examiner

COOLING STRUCTURE FOR AN ENERGY STORAGE DEVICE

CROSS REFERENCE TO RELATED APPLICATIONS

This application is a national stage application under 35 U.S.C. 371 and claims the benefit of PCT Application No. PCT/EP2014/069060 having an international filing date of Sep. 8, 2014, which designated the United States, which PCT application claimed the benefit of European Patent Application No. 13183795.7 filed Sep. 10, 2013, the disclosure of each of which are incorporated herein by reference in their entirety.

The invention relates to an energy storage device, particularly for use in motor vehicles, in accordance with the preamble of claim 1.

Energy storage devices of the type at issue here are generally known. They comprise at least one base body and at least one housing section fixed thereto, whereby the housing section serves to accommodate at least one energy storage unit such as for example a battery or a capacitor. The base body thereby forms a cover as it were to close the housing section containing the energy storage units. During operation of the energy storage device, a part of the output dissipates as thermal dissipation loss in the form of heat. For this reason, an energy storage device needs to comprise a suitable cooling device which is frequently of complex design and which thereby considerably increases the manufacturing costs of the energy storage device.

The task of the present invention is therefore the developing of an energy storage device which provides for effective cooling of said energy storage device and is moreover of simple structure and can thus be manufactured economically.

An energy storage device having the features of claim 1 is proposed in solution to the above-cited task. The energy storage device serves in particular for use in motor vehicles and comprises at least one base body and at least one housing section fixed thereto for accommodating at least one energy storage unit such as for example a battery or a plurality of centralized battery cells or one or more double-layer or supercapacitors respectively. The energy storage device is characterized by the base body comprising at least one integrated cooling duct for a gaseous medium.

An essential aspect of the invention is thus that the cooling device of the energy storage device according to the invention is of substantially passive design and the at least one cooling duct integrated into the base body (cover of the housing section) produces a stack effect which realizes passively effective cooling using the ambient air surrounding the energy storage device.

The at least one cooling duct preferably extends in a height direction and/or a transverse direction and/or a diagonal direction of the base body and is preferably open to at least an upper side of the energy storage device. This enables a particularly good stack effect to be obtained and passive cooling to thereby be realized; i.e. without needing additional propulsion or fluid conveying devices to produce a cooling effect. The base body is preferably of plate-shaped design and at least sections of the cooling duct integrally formed therein are preferably limited by two side walls of the plate-like base body. For example, it is conceivable for the cooling duct to be milled or drilled into the base body and be configured in the form of a passage or through-hole in said base body. However also conceivable is an embodiment of the invention in which the base body is not of one-piece configuration but rather two-piece configuration. Altogether, more than one, particularly two or more, preferably five air ducts can also be integrally disposed in the base body, same being arranged substantially parallel to one another and in particular arranged separated from each other by dividing bars.

To ensure particularly effective air intake at the lower side of the base body, the at least one cooling duct is preferably connected to at least one air intake opening provided in the base body and extending substantially perpendicular to the cooling duct. It can preferably be provided for the at least one cooling duct to be connected to at least two air intake openings provided on opposite peripheral sides of the base body. In order to improve the stack effect and the air intake into the base body or the cooling ducts respectively, it can additionally be provided for the plurality of cooling ducts to also be fluidly connected together at least in a lower half, particularly in a lower third of the base body.

In order to achieve an improved passive cooling effect by ambient air, the at least one air intake opening is preferably arranged in a lower half, particularly a lower third of the base body, relative to the base body's height direction. At least one fan, for example an electrically powered radial fan, can additionally be arranged on the energy storage device, particularly on the housing and/or the base body. Ambient air is then sucked in by the fan and blown into the air intake openings. This even further improves the cooling effect of the energy storage device. The fan is thus preferably connected to at least one of the air intake openings and is thereby designed to actively introduce air into the air intake opening.

The energy storage unit arranged in the housing can for example be a battery consisting particularly of a plurality of battery cells or a capacitor, particularly a double-layer or supercapacitor, whereby there can also be a plurality of energy storage units and thus a plurality of capacitors or the like. Preferably, the base body, which is in particular of cube-shaped and/or plate-like design respectively, comprises two opposite side surfaces, whereby a housing section for accommodating at least one energy storage unit is fixed to each of the side surfaces. In this case, the energy storage device is then of substantially symmetrical configuration and comprises a respective housing section on both sides of the base body which is again provided to respectively accommodate one or more energy storage units. Particularly in the case of a symmetrical arrangement, in which a respective housing section is disposed on both sides of the base body, the base body can comprise at least one current feed-through for electrical connectivity, particularly for the series connection of energy storage units disposed in separate housing sections. Two or more current feed-throughs are preferably provided. The current feed-through is preferably disposed such that it projects through the at least one cooling duct in the base body and in particular extends from one side surface of the base body to the opposite side surface of the base body (through the cooling duct). It can alternatively be provided for the current feed-through to be arranged through the dividing bars of the base body provided between two cooling ducts.

In order to enable particularly good conducting of the heat arising in the energy storage units to the base body and the cooling ducts, it is preferably provided for the at least one energy storage unit disposed in a housing section to be at least indirectly connected to a heat-conducting area joined to the base body. The heat-conducting area can be materials having high thermal conductivity, for example in the form of a heat-conducting pad made of a soft-silicone sheet or other such suitable material. The current feed-through arranged in the base body enables all the energy storage units to be connected in series, even as disposed in separate housing sections, and thus considerably increases the capacity of the energy storage device. Arranging the current feed-through in the cooling ducts also allows for advantageously cooling the current feed-throughs (high-current bridges). An indirect connection of the energy storage units to the base body via a heat-conducting area can particularly be made by means of a conductor plate to which the energy storage units are fixed such that the energy storage unit(s) is/are thus disposed on one side of the conductor plate and the heat-conducting area is disposed on the opposite side. The energy storage units are therefore affixed to a conductor plate, particularly soldered, while the conductor plate is connected to the base body via the heat-conducting area (heat-conducting pad).

It is particularly advantageous for the heat-conducting area to be of flat configuration and extend over a greater section between the respective conductor plate and the base body. It is incidentally to be noted that in order to obtain an effective stack effect, the at least one cooling duct is preferably also open to a lower side of the energy storage device. This allows air to enter into the cooling ducts at the lower side of the energy storage device or the base body respectively where the incoming cold air is heated. The heated air then rises in the cooling ducts. Due to the rising of the heated air, cold air is then sucked in again from the lower side of the base body (stack effect), thus providing effective evacuating of the components disposed in the housing sections for cooling the heat output. The heat-conducting area between the components and the base body thereby ensures optimum heat transfer to the base body and thus an optimum cooling effect.

Figure 2:
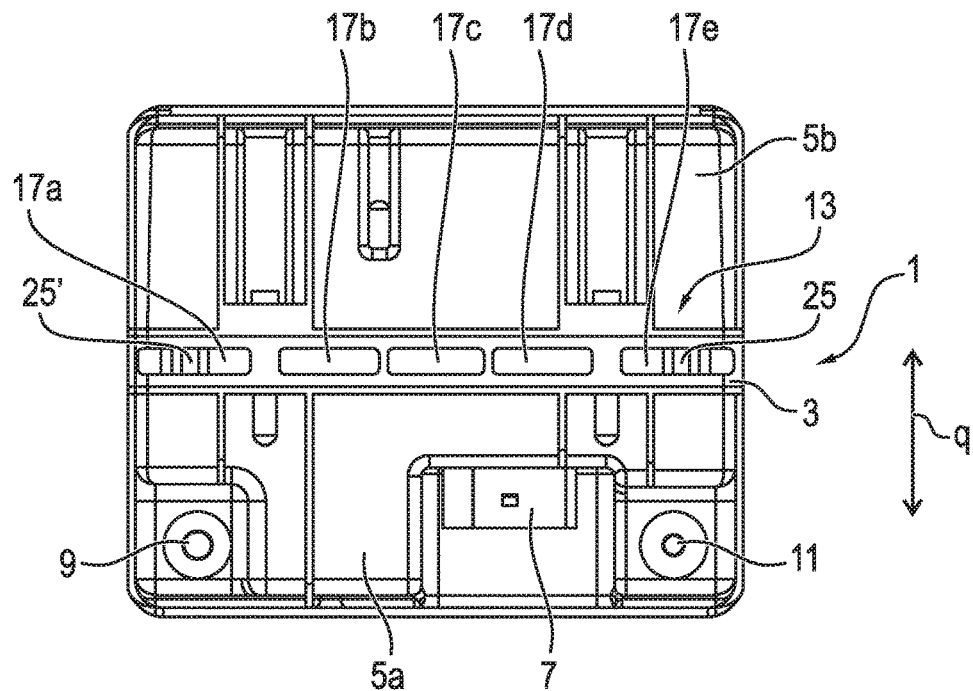
Figure 3:
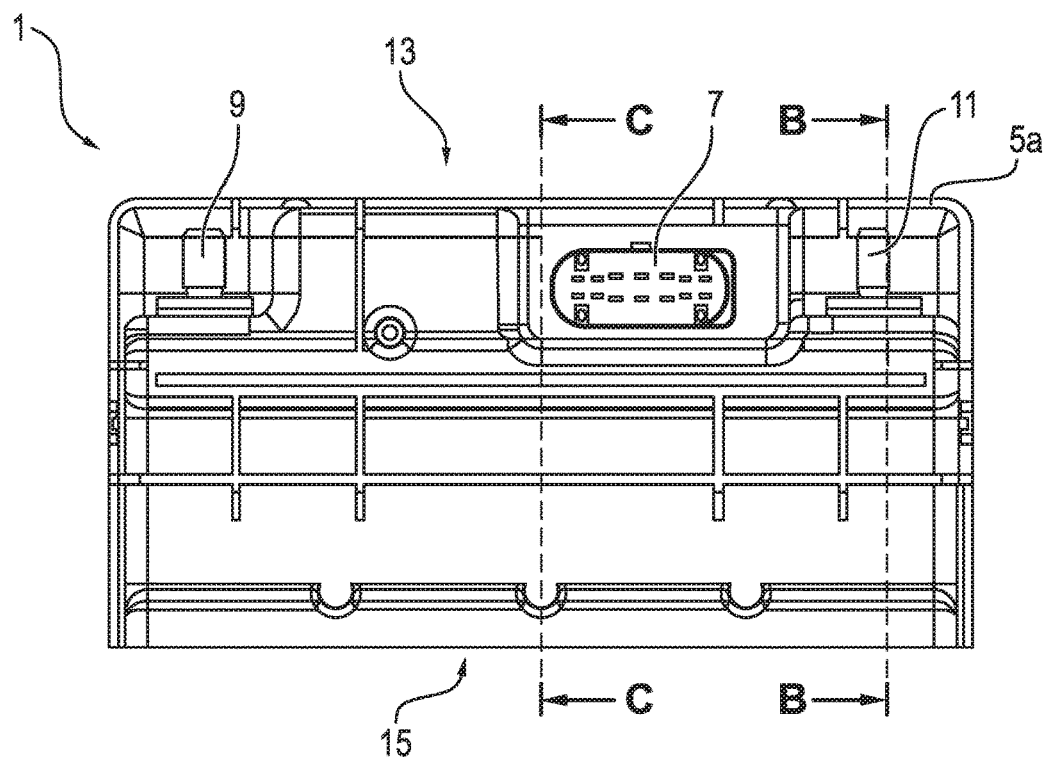
Figure 4:
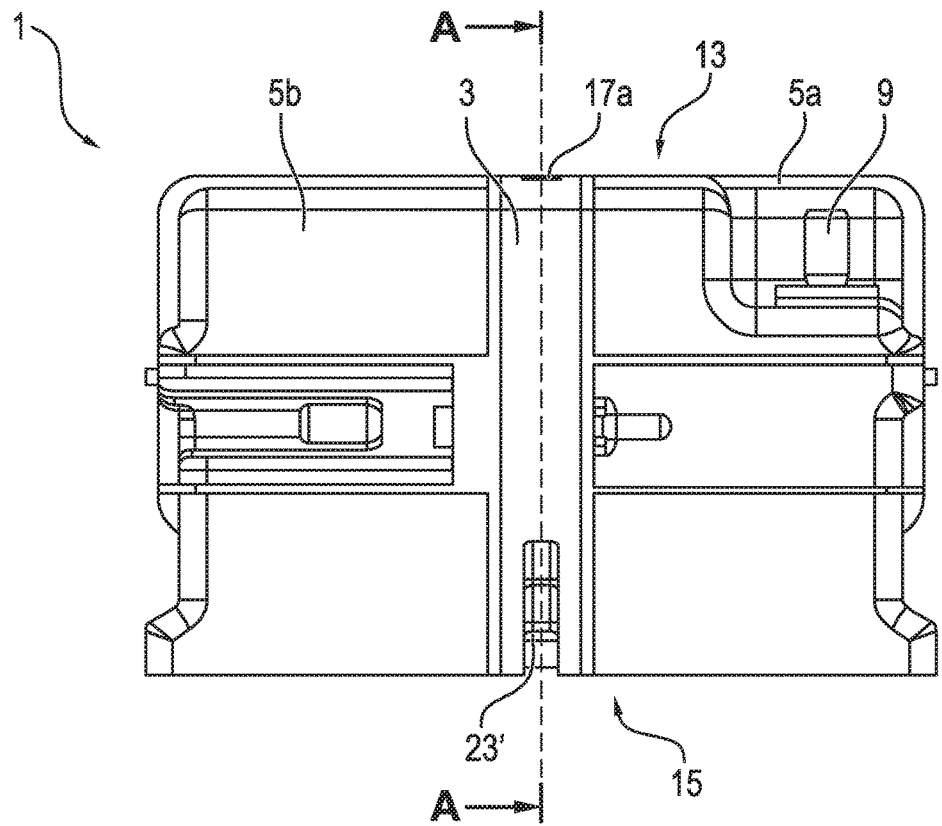
Figure 5:
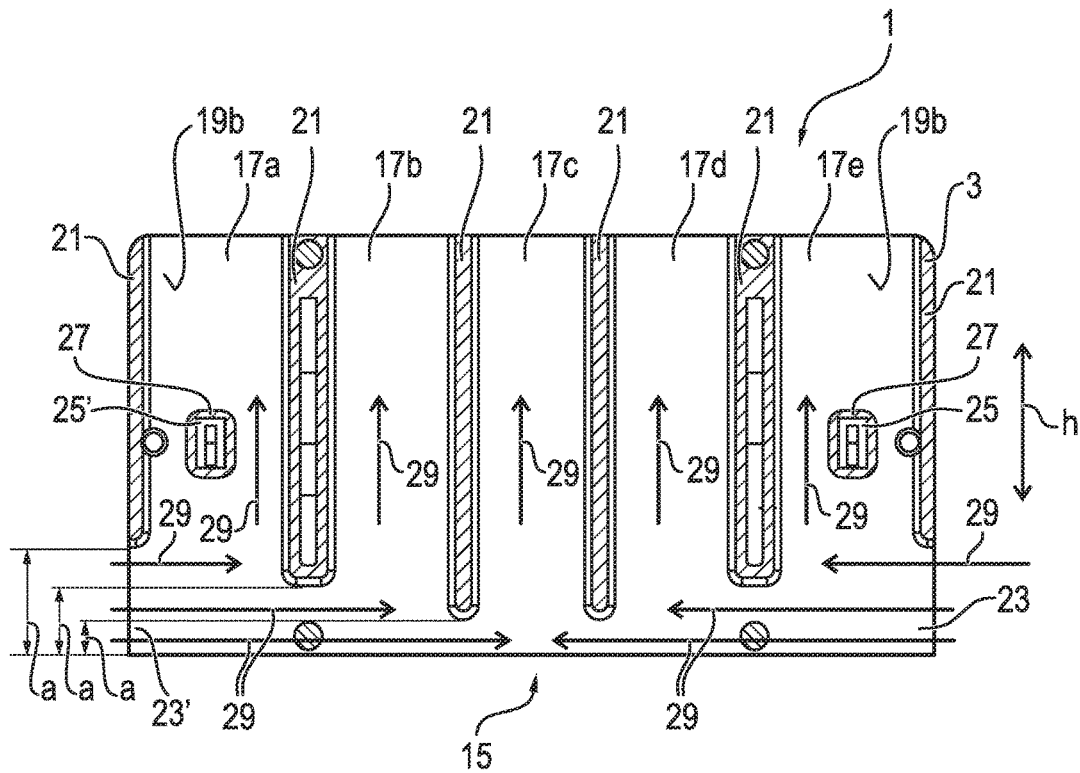
Figure 6:
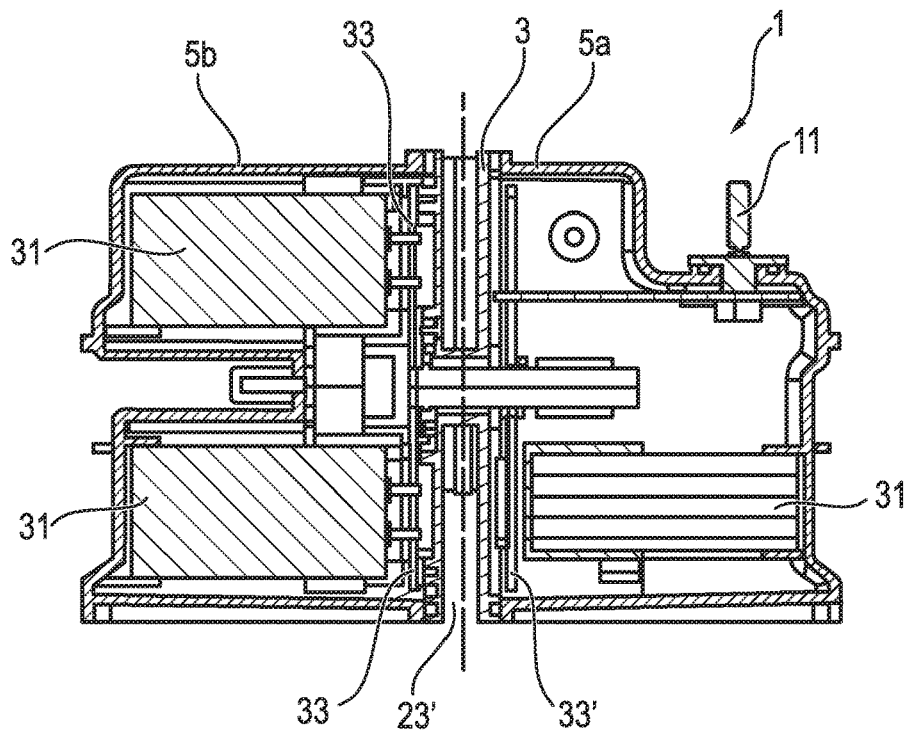

The following will reference the drawings in describing the invention in greater detail. Shown are:

FIG. 1 a perspective representation of an energy storage device according to the invention;

FIG. 2 a plan view onto the upper side of an energy storage device according to the invention;

FIG. 3 a side view of an energy storage device according to the invention;

FIG. 4 a frontal view of the energy storage device according to the invention;

FIG. 5 a sectional view of the energy storage device along the A-A line of intersection through the base body of the energy storage device; and FIG. 6 a sectional view along the B-B line of intersection of the energy storage device according to the invention.

Figure 7:
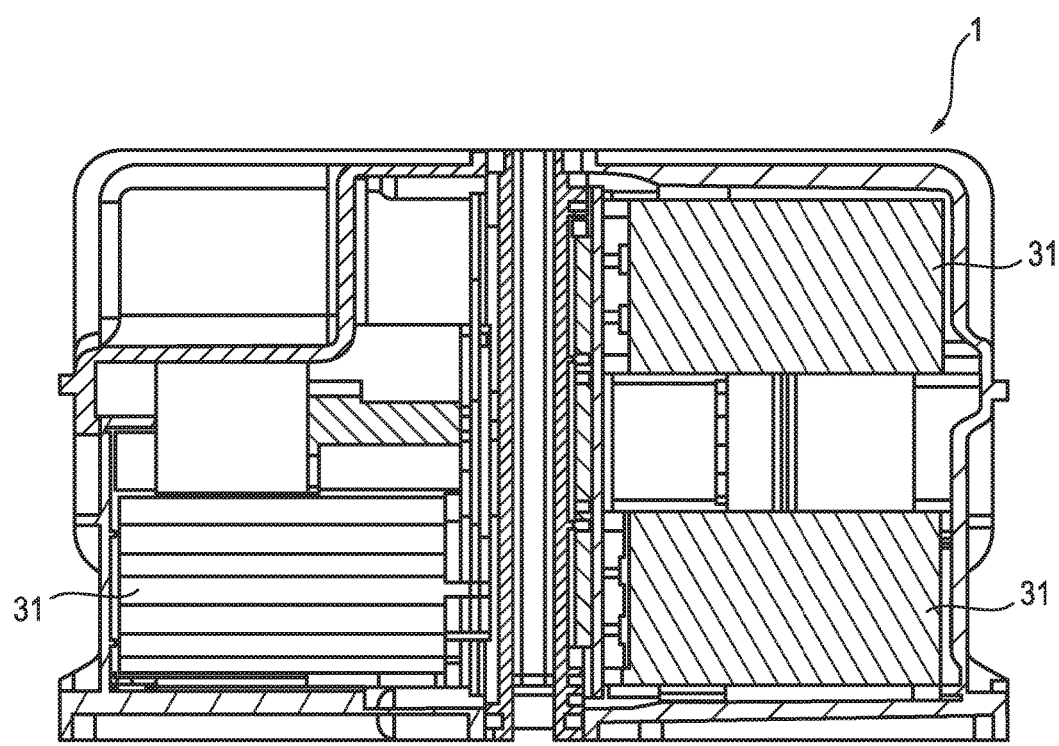

FIG. 7 a sectional view along the C-C line of intersection of the energy storage device according to the invention.

FIG. 1 shows a perspective representation of an energy storage device 1. In the embodiment shown in FIG. 1, the energy storage device 1 comprises a centrically arranged base body 3, which is of substantially rectangular and plate-like (cube-shaped) design. Two oppositely arranged housing sections 5a and 5b are connected to the base body 3, each connected to one respective side of the base body 3. The housing sections 5a and 5b are essentially open on the side facing the base body 3 so that the base body 3 serves in the manner of a cover for the two housing sections 5a and 5b.

Another embodiment of the invention can also provide for only housing section 5a being connected to the base body 3. The second housing section 5b essentially serves to accommodate additional energy storage units such as batteries or capacitors which can increase the total capacitance of the energy storage device 1. The housing sections 5a and 5b are preferably screwed or in some other way secured to the base body 3. Circumferential O-ring seals are preferably provided in the region of the bearing surfaces between the base body 3 and housing sections 5a and 5b, thereby ensuring a tight seal between the base body 3 and the housing sections 5a and 5b.

Both the base body 3 as well as housing sections 5a and 5b can be made from a plastic material, particularly in an injection molding or other suitable process. Producing the base body 3 from another material which is able to conduct heat particularly well is also conceivable. For example, it is conceivable for the base body 3 to be made of metal.

In the present embodiment, seven supercapacitor cells in particular can be provided in housing section 5a while a total of 14 supercapacitor cells can be disposed in the opposite housing section 5b. The total capacity of the energy storage device is thus clearly higher than in an embodiment without the second oppositely arranged housing section 5b. The housing section 5a moreover comprises a terminal 11 in particular configured as a 14-pole broadband connection and connected to a conductor plate (not shown in FIG. 1). The energy storage units in housing section 5a, thus the supercapacitors arranged therein in particular, are also connected to the respective broadband conductor plate. The broadband connection 7 enables signal control of the energy storage units in order to for example monitor charging and discharging capacity as well as temperature and other parameters and thus accordingly monitor and control the overall functionality of the energy storage device. When the energy storage device 1 is used in a motor vehicle, the terminal 7 can for example be connected to the vehicle bus system and the corresponding control devices to the vehicle electrical system. Housing section 5a furthermore comprises terminal posts, specifically a "negative" terminal 9 and a "positive" terminal 11.

The energy storage device 1 comprises an upper side 13 and a lower side 15, whereby the designations refer to an installed state of the energy storage device 1, particularly in a motor vehicle. The lower side faces the floor in said installed state such that the height direction h of the energy storage device 1 in the installed state corresponds substantially to vertical. Also recognizable in FIG. 1 are the five cooling ducts 17a to 17e open to the upper side 13 of the energy storage device 1 which are integrally formed in the base body 3. It is in particular provided for the cooling ducts 17a to 17e to likewise be open to the lower side 15 of the base body 3 so as to be integrally formed as through openings in said base body 3.

By the cooling ducts 17a to 17e being integrally formed in the base body 3, they are thus not only limited by two oppositely disposed side walls 19s and 19b but additionally by the dividing bars 21 separating the cooling ducts 17a to 17e from one another. A side air intake opening 23 extending substantially perpendicular to the height direction h and thus perpendicular to the cooling ducts 17a to 17e is provided in a lower third of the base body 3 relative to the height direction h of the energy storage device 1. A corresponding air intake opening 23 which is fluidly connected to the cooling ducts 17a to 17e is preferably provided on the opposite side of the base body 3 (not visible in FIG. 1).

FIG. 1 further makes it clear that the cooling ducts 17a to 17e have a substantially rectangular cross section and take up the greater part of the base body 3 such that the base body 3 consists predominantly of cooling ducts 17a to 17e and only to a lesser volumetric proportion of sides walls 19a, 19b and dividing bars 21.

FIG. 2 shows a plan view onto the upper side 13 of an energy storage device 1 according to the invention. FIG. 2 clearly shows that a current feed-through 25 and 25' is respectively provided in the two outer cooling ducts 17a and 17e which projects through the base body 3 and specifically the cooling ducts 17a and 17e in a transverse direction q perpendicular to the height direction h. The current feed-throughs 25 and 25' serve to connect the energy storage units provided in the housing sections 5a and 5b and particularly to connect them in series, their total energy then being able to be supplied to terminals 9 and 11.

FIG. 3 further shows a side view of housing section 5a with the two terminal posts 9 and 11 as well as the broadband connection 7.

FIG. 4 shows a frontal view of the energy storage device 1 illustrating the sandwich-like arrangement of the base body 3 between housing sections 5a and 5b as well as the arrangement of a further air intake opening 23' in a lower third of the base body 3.

FIG. 5 shows a sectional view of the energy storage device 1 along the A-A line of intersection (see FIG. 4). FIG. 5 thus shows a sectional view of the base body 3 with the cooling ducts 17a to 17e embedded therein. FIG. 5 clearly illustrates that the current feed-throughs 25 and 25' are arranged substantially centrically in the two outer cooling ducts 17a and 17e in order to connect the capacitors arranged in housing section 5b with the capacitors arranged in housing section 5a in series. It is in particular provided for the current feed-throughs 25 and 25' to in each case be enclosed by a housing wall 27 which is substantially adapted to the contour of said current feed-throughs 25 and 25' and thus tightly seals the current feed-throughs vis-à-vis the cooling ducts 17a and 17e. The housing walls 27 are thereby preferably integrally formed with walls 19a and 19b of the base body 3 and thereby form a manner of tunnel and/or sheathing for the current feed-throughs in the cooling ducts 17a and 17e. It is to be understood that further current feed-throughs can also be provided, particularly also in dividing bars 21. However, arranging the current feed-throughs 25 in the cooling ducts enables an effective cooling of same during the operation of the energy storage device 1.

FIG. 5 further makes it clear that the present embodiment provides for a total of five cooling ducts 17a to 17e extending in the height direction h, and particularly in the vertical direction when in the installed state, each separated by dividing bars 21 of the base body 3 and disposed substantially parallel to each other. The cooling ducts 17a to 17d are thus in particular provided essentially as through openings in the base body 3, which while exhibiting a substantially rectangular cross section in the present case, can however just as equally be circular or elliptical. FIG. 5 additionally makes clear that the air intake openings 23 and 23' respectively provided and oppositely disposed on the sides of the base body 3 are fluidly connected to each of the cooling ducts 17a to 17e so that a gaseous medium, particularly the ambient air of the energy storage device 1, enters the base body 3 through the air intake openings 23 and 23' and from there reaches the cooling ducts 17a to 17e. Hence, cold air flows through the air intake openings 23 and 23' along arrows 29 and is heated by the transfer of heat from the energy storage units to the base body 3 and as a result rises through the cooling ducts 17a to 17e in the direction of the upper side 13, this rise resulting in new cold air being in turn sucked in (stack effect).

A distance a is provided between each of the dividing bars 21 limiting the cooling ducts 17a to 17e at the lower side 15 of the base body 3 which defines the height of the respective air intake opening in the respective cooling duct. Here, the present embodiment provides for a successive reduction in the distance a between the lower end of the dividing bar 21 and the lower side 15 of the base body 3, particularly in steps, from the peripheral area toward the middle of the base body 3. The heated air can then escape from the cooling ducts 17a to 17e via the openings in the upper side 13 of the base body 3.

FIG. 6 shows a sectional view along the B-B line of intersection (see FIG. 3) of the energy storage device 1, and FIG. 7 shows a sectional view along the C-C line of intersection (see FIG. 3) of the energy storage device 1. Two energy storage units, specifically supercapacitors 31, are visible in FIG. 6 in housing section 5b, while the sectional view indicates one supercapacitor 31 in housing section 5a. All the supercapacitors 31 in housing section 5b are connected to a conductor plate 33 and in particular soldered thereto. The supercapacitors 31 in housing section 5a are connected to an equivalent conductor plate 33'. The supercapacitors 31 are furthermore connected to the base body 3 via heat-conducting areas 35, whereby the heat-conducting areas 35 can be a heat-conducting pad or the like made from a material having high thermal conductivity such as e.g. a soft-silicone sheet or the like.

Preferably, a separate heat-conducting area 35 is allocated to each energy storage unit, particularly each supercapacitor 31. It can alternatively be provided for a continuous heat-conducting area to be allotted to all or at least some of the energy storage units of a housing section. The heat-conducting area 35 or heat-conducting areas 35 respectively is/are preferably arranged between the conductor plates 33/33' and the respective associated side wall 19a, 19b of the base body 3 such that the heat-conducting area 35, or the plurality of separated heat-conducting areas 35 respectively, are thus connected on one side to the base body 3 and on the opposite side to the conductor plates 33/33'.

The heat-conducting areas can advantageously transfer the thermal losses of the energy storage units produced during the operation of the energy storage device 1 from the conductor plate to the base body 3 and from there to the air within the cooling ducts. As stated above, the heat-conducting area can be configured in the form of a pad or sheet and hence at least areas of same be arranged as a relatively thin material layer between the conductor plate and the base body. The conductor plates 33/33' are disposed at the open end of the housing sections 5a and 5b and thus face the base body 3 in the assembled state of the energy storage device 1.

All in all, the present invention achieves an advantageously passive cooling device for energy storage devices which makes use of the stack effect yielded by the cooling ducts arranged in the base body 3 in order to realize simple and yet effective passive cooling. Additionally, a fan (not shown in the figures), particularly an electrically powered radial fan, can also be provided which is fixed to at least one of the housing sections 5a or 5b and, in particular, additionally or alternatively fixed to the base body 3, and provides for improved air intake into the cooling ducts 17a to 17e. It is particularly provided for the energy storage device 1 to supply energy to the fan. FIG. 6 additionally also clearly illustrates that the air intake openings 23, 23' are not only open to one side of the base body 3 but also extend to the lower side 15 of the base body 3.

The passive cooling device according to the present invention can as a whole be particularly easily realized by incorporating cooling ducts of suitable structure into the base body and in particular at least indirectly providing additional heat-conducting areas 35 (indirectly via conductor plates 33, 33') between the energy storage units 31 and the base body 3. It is to be pointed out again here that it is not mandatory for the cooling ducts to extend in height direction h. In fact, it is conceivable for one or more cooling ducts to extend in the transverse direction q or even in a diagonal direction. It is in principle also conceivable to provide for combinations of multiple cooling ducts, each extending in different directions. An individual cooling duct can likewise also exhibit sections extending in different directions.

LIST OF REFERENCE NUMERALS 1 energy storage device
3 base body
5a, 5b housing section
7 (broadband) connection
9 terminal (−)
11 terminal (+)
13 upper side
15 lower side
17a to 17e cooling ducts
19a, 19b side walls
21 dividing bar
23, 23' air intake opening
25, 25' current feed-through
27 housing wall
29 arrow
31 supercapacitor
33, 33' conductor plate
35, 35' heat-conducting area
h height direction
q transverse direction
a distance

The invention claimed is:

1. An energy storage device, particularly for use in motor vehicles, comprising
at least one base body as well as at least one housing section fixed thereto for accommodating at least one energy storage unit, wherein the base body comprises at least one integrated cooling duct for a gaseous medium;
wherein the at least one cooling duct is connected to at least one air intake opening provided in the base body and extending substantially perpendicular to the cooling duct;
wherein the base body comprises two oppositely disposed side surfaces, wherein a housing section for accommodating the at least one energy storage unit is affixed to each of the side surfaces;
wherein the at least one cooling duct is separated by dividing bars and between each dividing bar and a lower side of the base body a distance A is provided which defines the height of the respective air intake opening into the respective cooling duct; and
wherein the distance A between the lower end of the dividing bars and the lower side of the base body is successively, stepwise reduced from the peripheral surface to the center of the base body.

2. The energy storage device according to claim 1, wherein the at least one cooling duct extends in a height direction (h) and/or a transverse direction and/or a diagonal direction of the base body and is open to at least an upper side of the energy storage device.

3. The energy storage device according to claim 1, wherein the base body is of plate-like configuration and the at least one cooling duct is at least sectionally limited by two side walls of the plate-like base body.

4. The energy storage device according to claim 1, wherein two or more air ducts are arranged substantially parallel to one another and separated from each other by the dividing bars.

5. The energy storage device according to claim 4, wherein the two or more air ducts are five air ducts.

6. The energy storage device according to claim 1, wherein the at least one cooling duct is connected to at least two air intake openings provided on opposite peripheral sides of the base body.

7. The energy storage device according to claim 1, wherein the at least one air intake opening is arranged in a lower half of the base body, relative to the height direction of the base body.

8. The energy storage device according to claim 7, wherein the at least one air intake opening is arranged in a lower third of the base body, relative to the height direction of the base body.

9. The energy storage device according to claim 1, wherein at least one fan is arranged on the energy storage device.

10. The energy storage device according to claim 9, wherein the at least one fan is a radial fan, and the at least one fan is arranged on one of the at least one housing section and the base body.

11. The energy storage device according to claim 9, wherein the at least one fan is connected to an air intake opening to introduce air into the air intake opening.

12. The energy storage device according to claim 1, wherein the at least one energy storage unit is a battery or a capacitor.

13. The energy storage device according to claim 12, wherein the capacitor is a supercapacitor.

14. The energy storage device according to claim 1, wherein the base body comprises at least one current feed-through for the electrical connectivity of energy storage units disposed in separate housing sections.

15. The energy storage device according to claim 12, wherein the at least one current feed-through projects through the at least one cooling duct and extends from one side surface of the base body to the opposite side surface of the base body.

16. The energy storage device according to claim 14, wherein the electrical connectivity is a series connection.

17. The energy storage device according to claim 1, wherein the at least one energy storage unit disposed in a housing section is at least indirectly connected to the base body via a heat-conducting area.

18. The energy storage device according to claim 17, wherein said heat-conducting area is a conductor plate.

19. The energy storage device according to claim 1, wherein the at least one cooling duct is open to a lower side of the energy storage device.

* * * * *